US008523265B2

(12) United States Patent
Leist et al.

(10) Patent No.: US 8,523,265 B2
(45) Date of Patent: Sep. 3, 2013

(54) MULTIPURPOSE TRANSPORT SYSTEM HAVING A ROOF ASSEMBLY AND METHOD FOR TRANSPORTING FOREST BIOMASS AND WOOD RESIDUALS

(75) Inventors: James R. Leist, Columbus, MS (US); Frank Corley, Greenville, AL (US)

(73) Assignee: Weyerhaeuser NR Company, Federal Way, WA (US)

( * ) Notice: Subject to any disclaimer, the term of this patent is extended or adjusted under 35 U.S.C. 154(b) by 218 days.

(21) Appl. No.: 12/888,076

(22) Filed: Sep. 22, 2010

(65) Prior Publication Data
US 2012/0070265 A1 Mar. 22, 2012

(51) Int. Cl.
*B60P 1/00* (2006.01)
*B60J 7/16* (2006.01)

(52) U.S. Cl.
USPC ................. 296/100.1; 296/100.01; 296/185.1

(58) Field of Classification Search
USPC ............. 296/100.01, 100.02, 100.06–100.09, 296/185.1
See application file for complete search history.

(56) References Cited

U.S. PATENT DOCUMENTS

| | | | |
|---|---|---|---|
| 3,357,576 A | 12/1967 | Strombeck et al. | |
| 3,544,153 A | 12/1970 | Galbreath et al. | |
| 3,986,749 A * | 10/1976 | Hull et al. | 296/100.09 |
| 4,302,044 A * | 11/1981 | Sims | 296/186.4 |
| 4,627,658 A | 12/1986 | Vold et al. | |
| 4,691,957 A | 9/1987 | Ellingson | |
| 5,713,712 A | 2/1998 | McIntyre | |
| 6,142,553 A | 11/2000 | Bodecker | |
| 6,321,819 B1 * | 11/2001 | Copp et al. | 160/35 |
| 6,402,223 B2 * | 6/2002 | Ser et al. | 296/100.08 |
| 7,316,531 B2 | 1/2008 | Whitehead et al. | |
| 2006/0208526 A1 | 9/2006 | Talbot et al. | |

OTHER PUBLICATIONS

Rawlings, C., et al., "A Study of How to Decrease the Costs of Collecting, Processing and Transporting Slash," Montana Community Development Corporation, Missoula, MT, Dec. 21, 2004.
Maker, T., "Wood-Chip Heating Systems, A Guide for Institutional and Commercial Biomass Installations," Biomass Energy Resource Center, Washington, D.C., 1994.
RE Consulting, Innovative Natural Resource Solutions LLC, "Renewable biomass from the Forests of Massachusetts," Forest Harvesting Systems for Biomass Production, Massachusetts Division of Energy Resources & Massachusetts Department of Conversation & Recreation, Jun. 2007.
"Biomass Transportation and Delivery Fact Sheet 4.5", Sustainable Forestry for Bioenergy and Bio-based Products, "known to Applicant prior to Applicant's filing date (Sep. 22, 2010)."
Placer County Chief Executive Office, Auburn, CA; TSS Consultants, Rancho Cordova, CA, "Forest biomass Removal on National Forest Lands—First Progress Report," The Sierra Nevada Converancy Auburn, California, Nov. 17, 2008.
Evans, Alexandar M., "Synthesis of Knowledge from Woody Biomass Removal Case Studies", Forest Guild, US Forest Service, Forest Guildm Santa Fe, NM, Sep. 2008.

* cited by examiner

*Primary Examiner* — Glenn Dayoan
*Assistant Examiner* — Melissa A Black
(74) *Attorney, Agent, or Firm* — Woodcock Washburn LLP

(57) ABSTRACT

The present disclosure generally relates to a multipurpose transport system, a roof assembly, and methods for transporting forest biomass and wood residuals. Roof assemblies according to the disclosure are mountable on a top portion of a transport system. In some embodiments, roof assemblies include two or more panels, one or more panel movements assemblies operably connected each of the two or more panels, and one or more actuation assemblies. The two or more panels extend from a first side of the roof assembly to and second side of the roof assembly in a louvered configuration. Each of the two or more panels are moveable between a first position and a second position. Further aspects of the disclosure are directed towards multipurpose transport systems and methods for transporting forest biomass and wood residuals using systems according to the disclosure.

20 Claims, 13 Drawing Sheets

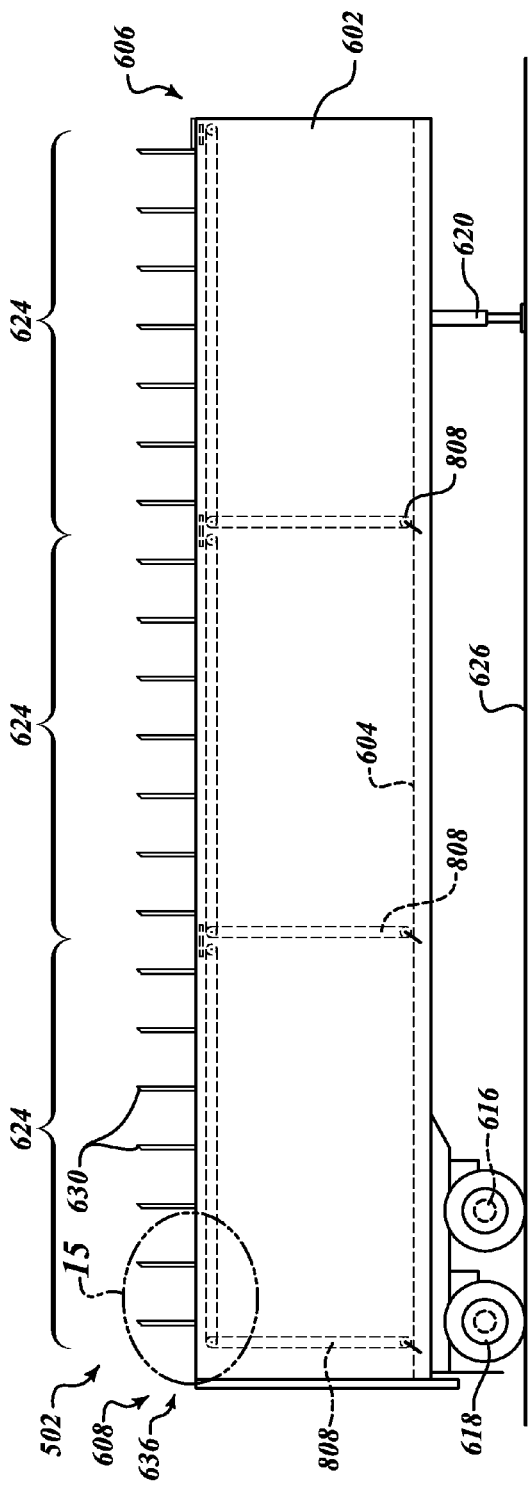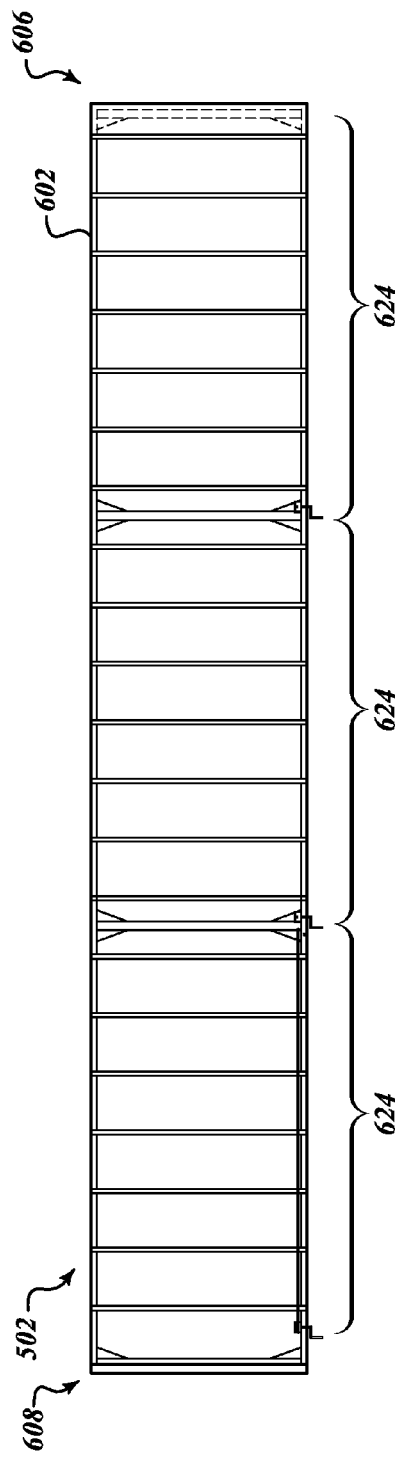

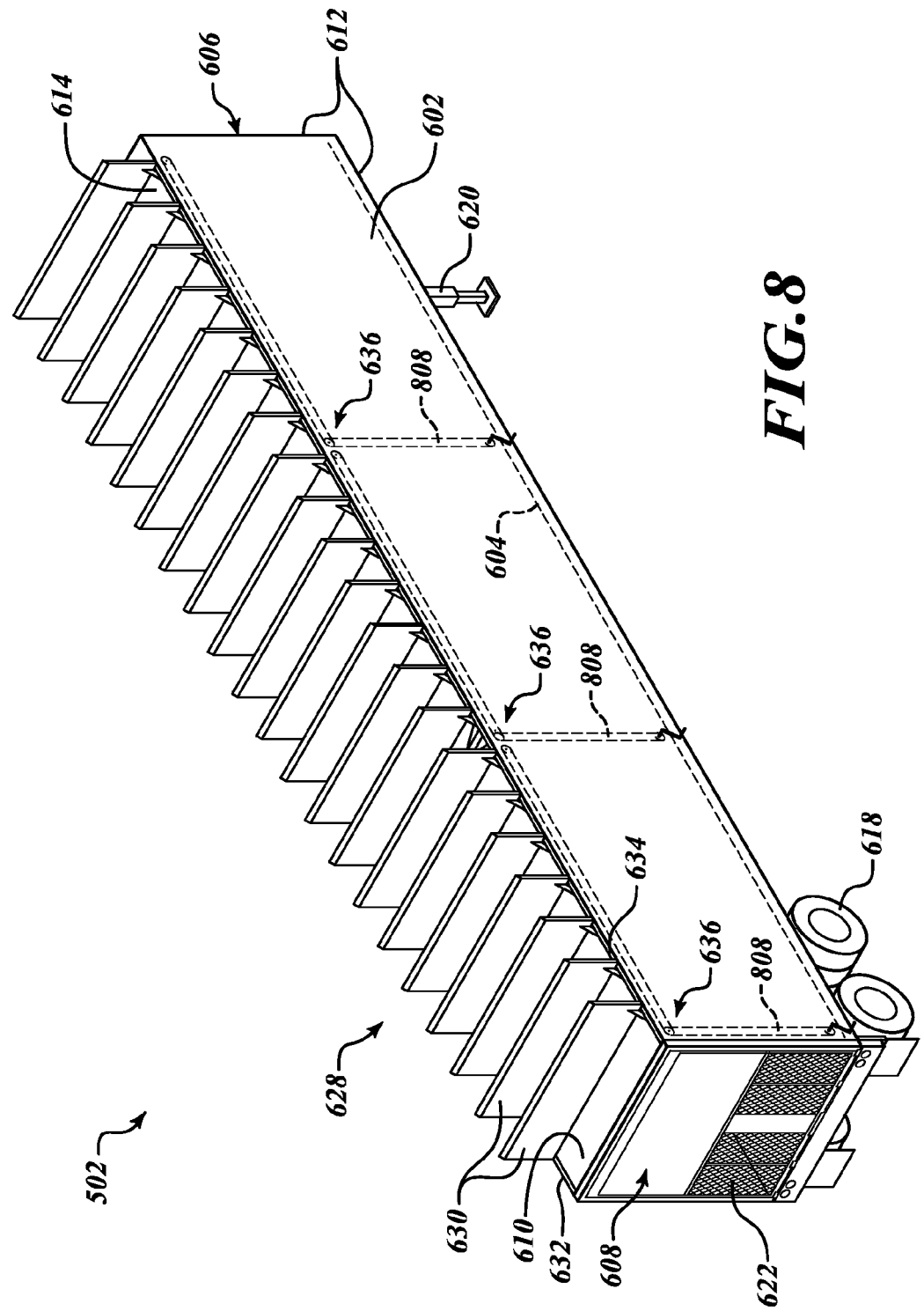

US 8,523,265 B2

MULTIPURPOSE TRANSPORT SYSTEM HAVING A ROOF ASSEMBLY AND METHOD FOR TRANSPORTING FOREST BIOMASS AND WOOD RESIDUALS

TECHNICAL FIELD

The present disclosure is directed generally to a multipurpose transport system, a roof assembly for use with transport systems according to the disclosure, and methods for transporting forest biomass and wood residuals using multipurpose transport systems.

BACKGROUND

Recent technical developments for utilizing biomass as an alternative energy source have presented a number of promising opportunities for the forestry industry. Forest biomass has the potential for use in countless different applications including generating heat, production of liquid fuel, production of biogas, generating bioelectricity, and production of feedstock for chemicals and other materials. Forest biomass generally includes any plant or tree material produced by forest growth. A key challenge in using forest biomass for energy production is accomplishing harvest, processing, and transportation at reasonable costs. Transportation can often pose unique challenges because the equipment used to transport traditional forest product materials cannot always be used in biomass application without substantial and costly modifications.

In traditional forestry operations, the term "chip van" refers to a tractor/trailer rig which uses a large-capacity, top or rear loaded trailer that is designed to haul bulk material. An example of a conventional chip van 100 for transporting wood residuals (e.g., chips) is shown schematically in FIGS. 1 and 2. As shown in FIG. 1, the chip van 100 includes a cab portion 102 connected to one or more storage portions 104. Each storage portion 104 has an open top 106. During loading, the chip van 100 is parked in a saw mill, engineered wood product plant or any other wood products facility as shown in FIG. 2. Wood residuals 202 are then deposited into the storage portion 104 via the open top 106. Referring back to FIG. 1, the open top may 106 be covered with a tarp 108 during travel to prevent the material inside the storage portion 104 from falling out. This practice can result in safety hazards associated with attaching the tarp or the tarp becoming loose during transportation. In addition, material also can blow out of the top of the van onto the roadway during transport even when tarped.

In an effort to improve biomass transportation, some manufacturers have modified traditional chip vans to make them more suitable for biomass applications. Referring to FIG. 3, an example of a chip van 300 for transporting biomass is shown schematically. As shown in FIG. 3, the chip van includes a cab portion 302 connected to one or more storage portions 404. Each storage portion 304 has a closed top 306 and an open back end 308. The chip van 300 is loaded by blowing biomass 402 into the open back end 308 as shown in FIG. 4. A gate, door, or another closing mechanism 404 may be provided to secure the loaded biomass 402 during transport.

Most biomass transportation systems are limited to the sole functionality of transporting forest biomass. Likewise, most wood residual transportation systems are limited to the sole functionality of transporting wood residuals. Accordingly, there is an opportunity to improve current transportation technology by expanding the functionality of biomass transportation equipment to include capabilities associated with transport of more traditional forest product materials (e.g., chips, logs, etc.). Furthermore, the ability to retrofit traditional forestry equipment for biomass applications could result in a meaningful cost savings. Thus, there is a need to develop new systems and methods for biomass transport, which combine the functionality of conventional transportation equipment with equipment suited for the transportation challenges posed by forest biomass.

SUMMARY

The following summary is provided for the benefit of the reader only and is not intended to limit in any way the invention as set forth by the claims. The present disclosure is directed generally towards a multipurpose transport system having a roof assembly that is suitable for transport of forest biomass and wood residuals.

In one embodiment, the disclosure includes a roof assembly that is mountable on a top portion of a transport system. In some embodiments, roof assemblies include two or more panels, one or more panel movements assemblies operably connected to each of the two or more panels, and one or more actuation assemblies. The two or more panels extend from a first side of the roof assembly to and second side of the roof assembly in a louvered configuration. Each of the two or more panels are moveable between a first position and a second position.

Further aspects of the disclosure are directed towards multipurpose transport systems incorporating roof assemblies according to the disclosure. In some embodiments, multipurpose transport systems according to the disclosure include one or more storage assemblies and one or more movement assemblies. Storage assemblies according to the disclosure may include a trailer having a rear containment device. Roof assemblies according to the disclosure may be mounted on a top portion of trailer according to the disclosure. Further aspects of the disclosure are directed towards methods for transporting forest biomass and wood residuals using systems according to the disclosure.

BRIEF DESCRIPTION OF THE DRAWINGS

The present disclosure is better understood by reading the following description of non-limitative embodiments with reference to the attached drawings wherein like parts of each of the figures are identified by the same reference characters, and are briefly described as follows:

FIG. 6 is a side view of a storage assembly for the multipurpose transport system from FIG. 5;

FIG. 7 is a top view of the storage assembly for the multipurpose transport system from FIG. 5;

FIG. 8 is a schematic three-dimensional view of the storage assembly for the multipurpose transport system from FIG. 5;

DETAILED DESCRIPTION

The present disclosure describes a multipurpose transport system, a roof assembly, and methods for transporting forest biomass and wood residuals using systems according to the disclosure. Certain specific details are set forth in the following description and FIGS. 5-20 to provide a thorough understanding of various embodiments of the disclosure. Well-known structures, systems, and methods often associated with such systems have not been shown or described in details to avoid unnecessarily obscuring the description of various embodiments of the disclosure. In addition, those of ordinary skill in the relevant art will understand that additional embodiments of the disclosure may be practiced without several of the details described below.

In this disclosure, the term "wood" is used to refer to any organic material produced from trees, shrubs, bushes, grasses or the like. The disclosure is not intended to be limited to a particular species or type of wood. The term "biomass" is used to refer to a renewable energy source that is a biological material derived from living or recently living organisms. The term "forest biomass" is used to describe any type of biomass produced by forest growth such as dead trees, non-merchantable trees, branches, understory, tree stumps, clipping, logging residue, stems, wood chips, or other similar material. The term "wood residuals" is used to refer to any wood-based waste material produced from a saw mill, engineered wood manufacturing facility, or other wood product production facility. Examples of wood residuals suitable for use with embodiments of the disclosure include but are not limited to chips, saw dust, shavings, and other similar materials.

Figure 1:
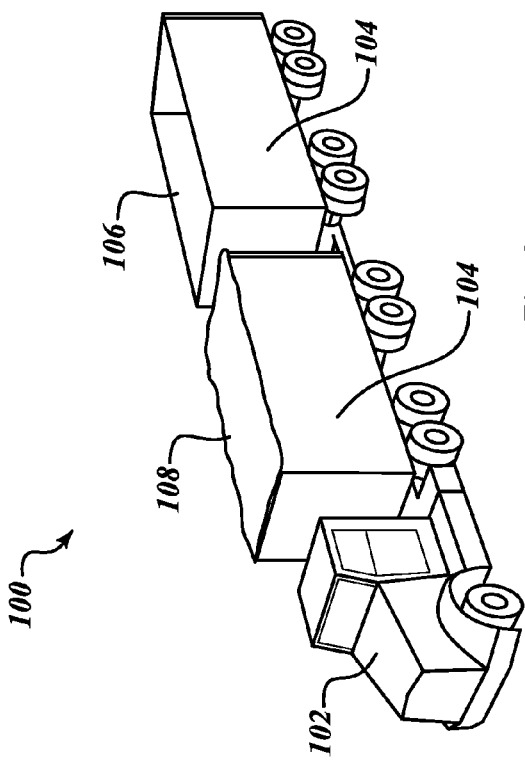
FIGS. 1 and 2 are schematic views of a conventional open top transport system.
Figure 2:
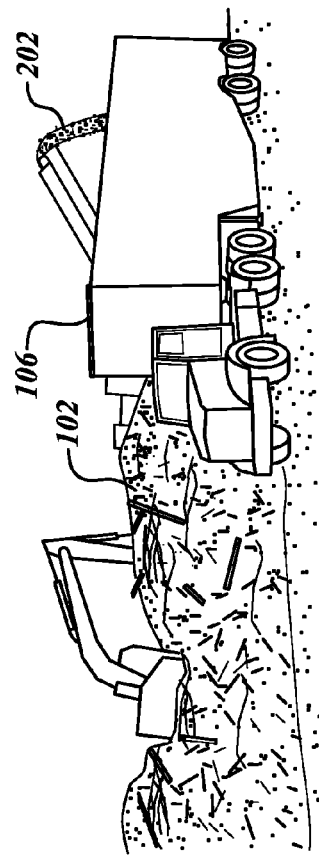
Figure 3:
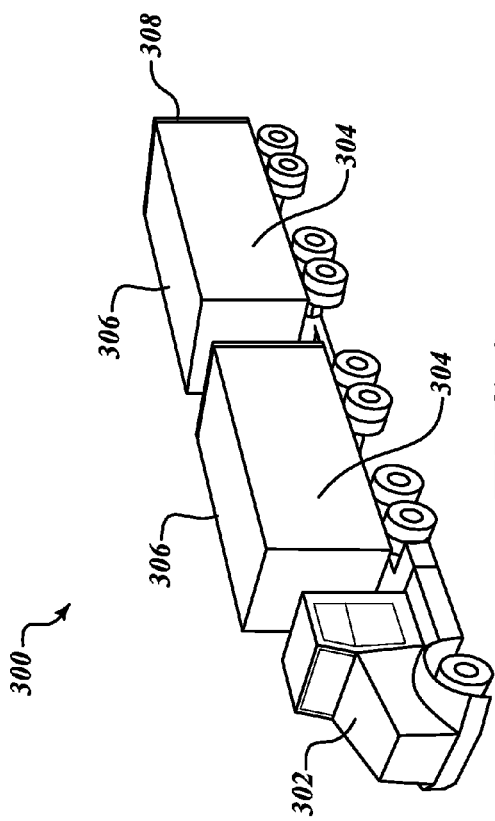
FIGS. 3 and 4 are schematic views of a conventional end-loaded transport system.
Figure 4:
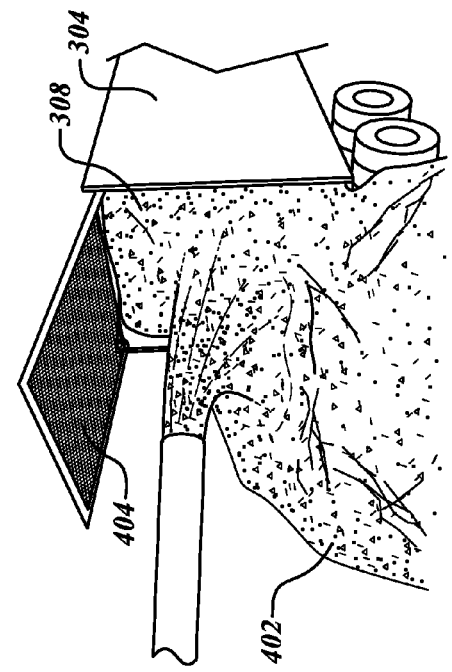
Figure 5:
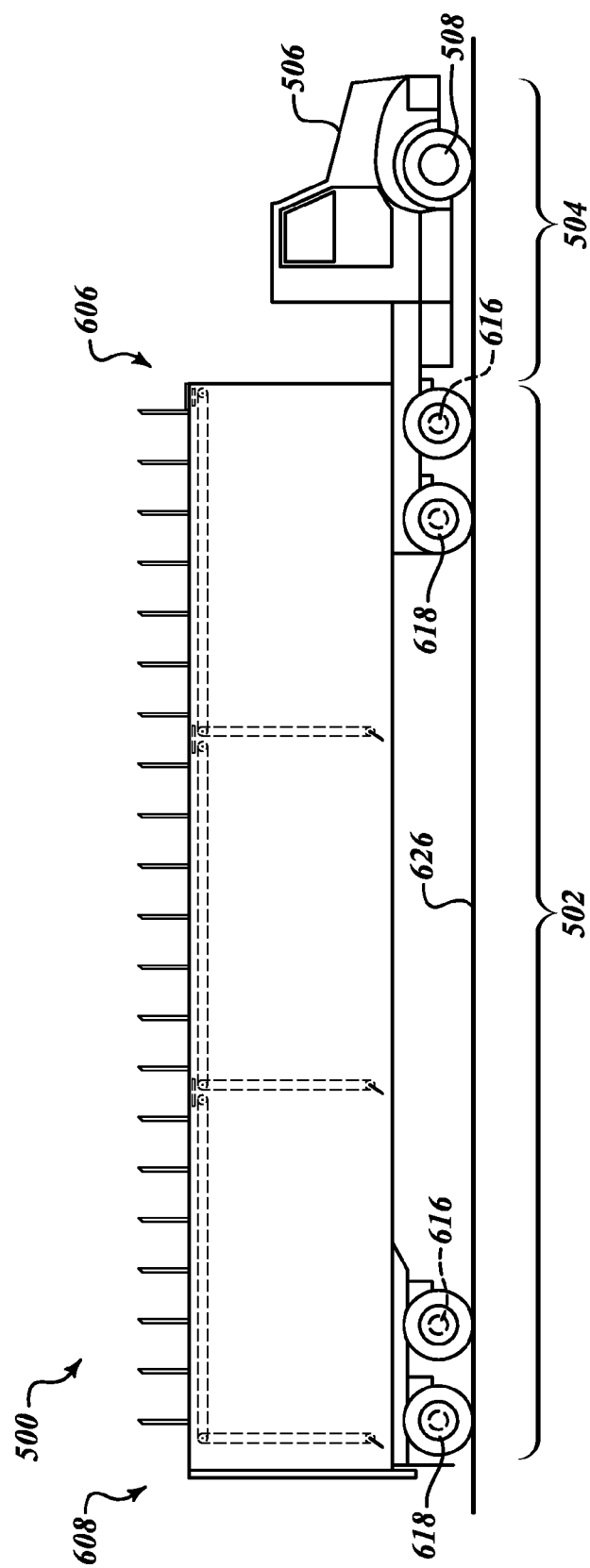
FIG. 5 is a side view of a multipurpose transport system according to embodiments of the disclosure.

FIG. 5 is a schematic view of an embodiment of a multipurpose transport system 500 according to embodiments of the disclosure. The multipurpose transport system 500 in FIG. 5 includes a storage assembly 502 and a movement assembly 504. The movement assembly 504 may be an operator cab 506 having a plurality of wheels 508 or any other device suitable for hauling the storage assembly 502 (e.g., a tractor, van, etc.). The storage assembly 502 may be a trailer 602 or any other suitable structure for containing forest biomass or wood residuals. In some embodiments, one or more storage assemblies 502 may be connected end-to-end and pulled, pushed, or otherwise transported by the movement assembly 504.

FIGS. 6, 7, and 8 show further details of storage assemblies 502 according to embodiments of the disclosure. In some embodiments, the storage assembly 502 includes a floor 604, a front end 606, and a back end 608. One or more side walls 610 may extend from the floor 604 in a so that they are substantially parallel to one another. In some embodiments, a single side wall, or side walls arranged in a configuration that is different than those explicitly shown in the Figures may be used. A frame 612 and one or more panel members (e.g., a front panel 614, the side walls 610, and the floor 604) arranged on the frame 612 define a storage container (e.g., the trailer 602). FIG. 8 shows a frame 612 having a substantially rectangular prismatic shape; however, frames having different shapes (e.g., circular, cylindrical, pyramid-shaped) are envisioned as part of the disclosure.

In some embodiments, the frame 612 may be mounted on at least one axle 616 operably connected to at least one wheel 618. One or more support legs 620 may be attached to the floor 604 so that the trailer 602 remains in an upright position when disconnected from the movement assembly 504. In some embodiments, the one or more support legs 620 may be retractable or otherwise configured to fold into the floor 604 of the trailer 602.

Referring to FIG. 8, some embodiments include a rear containment device 622 mounted on the back end 608 of the trailer 602. The rear containment device 622 may be a door, a gate, a mesh covering, or any suitable device for containing forest biomass or wood residuals inside the trailer 602 during transport. In some embodiments, the rear containment device 622 covers a portion of the back end 608 leaving the back end 608 partially open. Although not explicitly shown in FIG. 8, embodiments of the disclosure may include rear containments devices 622, which cover the back end 608 entirely. Rear containment devices 622 according to embodiments of the disclosure may be detachable or may be opened and closed via a hinge mechanism or another suitable opening and closing device. Sliding doors, tarps, or other coverings known to a person of ordinary skill in the art may be used as rear containment devices 622.

Referring to FIGS. 6 and 7, some embodiments of the disclosure include one or more roof assemblies 624 mounted on a top portion 628 of the trailer 602. FIGS. 5-8 depict embodiments of storage assemblies 502 having three roof assemblies 624; however, different numbers of roof assemblies may be used in other embodiments. In FIG. 6, the roof assemblies 624 are shown mounted in horizontal planar alignment with the floor 604 of the trailer 602. In addition, other configurations are envisioned as part of the disclosure. For example, the one or more roof assemblies 624 may be arranged in any configuration so that they are substantially parallel to a terrain 626 (see FIG. 5) on which the multipurpose transport system 500 is moving.

Each roof assembly 624 includes two or more panels 630. The panels 630 may be arranged on the top portion 628 of the trailer 630 so that they extend from a first side 632 of the roof assembly 624 to a second side 634 of the roof assembly 624. In some embodiments, the disclosure may include a roof assembly 624 that is detachable from the top portion 628 of the trailer 602. Accordingly, old equipment may be retrofitted so that it is suitable for transportation of forest biomass and wood residuals according to embodiments of the disclosure.

Figure 10:
FIG. 10 is a side view of the panel from FIG. 9.
Figure 12:
FIG. 12 is a side view of the panel from FIG. 11.
Figure 9:
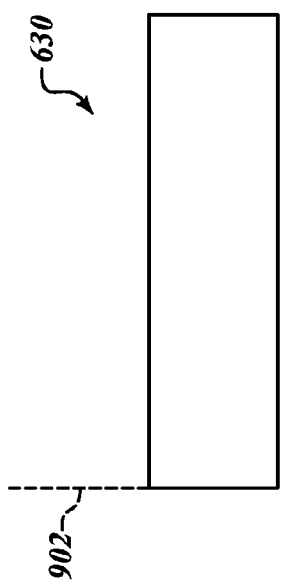
FIG. 9 is a top view of an embodiment of a panel for use with a roof assembly according to embodiments of the disclosure.
Figure 11:
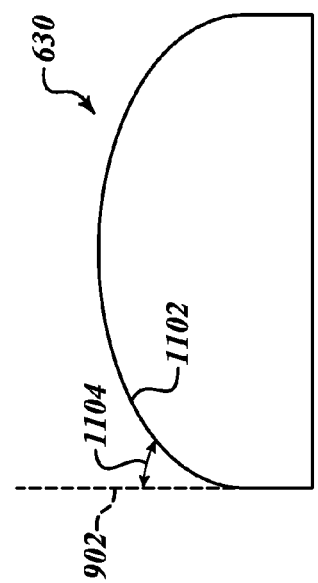
FIG. 11 is a top view of another embodiment of a panel for use with a roof assembly according to embodiments of the disclosure.

Each panel 630 may be constructed from one or more aluminum plates. In some embodiments, other materials known to a person of ordinary skill in the art (e.g., any type of metal, composite, or similar material) may be used instead of aluminum. Panels 630 according to embodiments of the disclosure may have a number of different shapes. Referring to FIGS. 9-12, two exemplary embodiments of panel shapes are illustrated. FIGS. 9 and 10 show an exemplary panel 630 having a substantially rectangular shape. The panel 630 is shown arranged on a vertical axis 902. FIGS. 11 and 12 show an exemplary panel 630 having an angled shape arranged on the vertical axis 902. As shown in FIG. 11, the panel 630 has an angled side 1102, which forms a side panel angle 1104 with respect to the vertical axis 902. In some embodiments the side panel angle 1104 may be between about 5 degrees and about 90 degrees.

FIGS. 10 and 12 illustrate side views of exemplary panels 630. Each panel 630 includes a top portion 1002 and a bottom portion 1004. The top portion 1002 has a first width 1006 and the bottom portion 1004 has a second width 1008. In some embodiments, the first width 1006 is substantially smaller than the second width 1008. Accordingly, the top portion 1004 of each panel 630 may be substantially more narrow than the bottom portion 1006.

Referring back to FIGS. 6-8, panels 630 according to the disclosure are arranged as part of each roof assembly 624 in a louvered configuration. In this disclosure, the term "louvered" is used to mean "supplied with louvers." The term "louvers" is used to mean "a series of openings framed at their longer edges with slanting, overlapping fins or slats." Configurations of panels 630 according to the disclosure are best shown in FIG. 8. The panels 630 may be configured so that they are adjustable between a first (e.g., open) position and a second (e.g., closed) position. In some embodiments, the panels 630 may be adjustable between one or more third (e.g., intermediate) positions.

Figure 13:
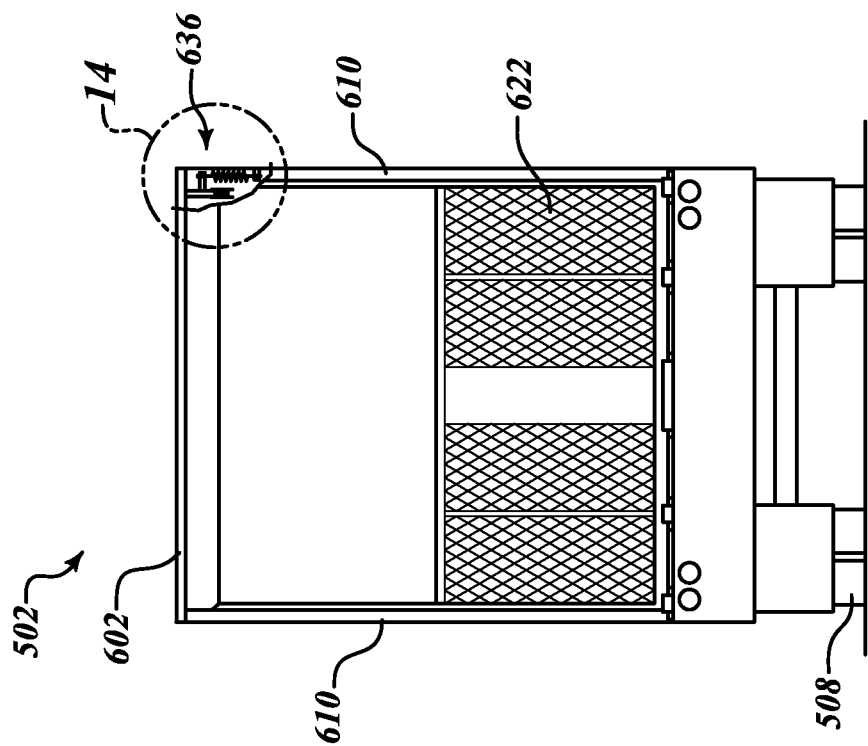
FIG. 13 is a rear view of the multipurpose transport system from FIG. 5.

One or more panel movement assemblies are provided for moving the panels 630 between the first, second, and optionally third positions. FIG. 13 is a rear view of a multipurpose transport system 502 according to the disclosure having a panel movement assembly 636 arranged in the rear back corner of the trailer 602. Referring back to FIG. 8, an embodiment having three panel movement assemblies 636 is shown. In some embodiments, panel movement assemblies 636 may be placed in different locations other than those explicitly shown.

Figure 14:
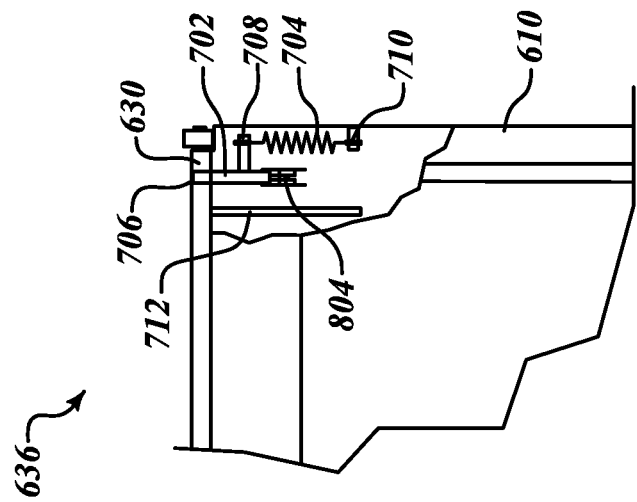
FIG. 14 is a schematic view of a panel movement assembly according to embodiments of the disclosure.

FIG. 14 is a more detailed view of a panel movement assembly 636 according to embodiments of the disclosure. The panel movement assembly 636 in FIG. 14 includes a lever 702 and a spring mechanism 704. The lever 704 may include a vertical portion 706 and a horizontal portion 708. The horizontal portion 708 may be operably connected to the spring mechanism 704, which may be mounted to the side wall 610 of the trailer 602 with a mounting device 710 so that it is substantially parallel to the vertical portion 706 of the lever 702. In some embodiments, one or more barrier devices 712 (e.g., metal, aluminum or steel) may be arranged to cover each panel movement assembly 636, thereby protecting it from chips, thinning, or other debris that may interfere with its operation.

Movement of the panels between positions will now be explained primarily with reference to FIGS. 14-17. To facilitate movement between the first position, the second position, and intermediate positions, storage assemblies 502 according to embodiments of the disclosure may also include one or more actuation assemblies 1500 shown in FIGS. 15-17 in conjunction with an exemplary panel movement assembly 636. Each actuation assembly 1500 may include a cable mechanism 802 (e.g., a cable, wire rope, or another type of flexible material) wound around a reel mechanism 804 (e.g, a cable drum). In some embodiments, a suitable cable mechanism 802 is wire rope having a diameter of approximately 3/16 of an inch. The cable mechanism 802 may be connected to each panel 630 via the lever 702 and the spring mechanism 704. In some embodiments, an engagement mechanism 806 (e.g., a one inch diameter ball) may be used to engage the lever 702. A winch mechanism 808 (e.g., any type of lifting device consisting of a horizontal cylinder turned by a crank) is used to adjust the tension of the cable mechanism 802. For example, an air actuated system utilizing a cylinder connected to a rod may be used. As the cylinder is actuated, the panels may be lifted by the rod.

Referring to FIGS. 6 and 8, storage assemblies 502 according to the disclosure may include one or more panel movement assembly 636 and one or more actuation assembly 1500. Generally, one winch mechanism 808 is provided for each panel movement assembly 636. Accordingly, in FIGS. 6 and 8, the storage assembly 502 depicted has three panel movement assemblies 636 and three corresponding winch mechanisms 808. A person of ordinary skill in the art will appreciate that different numbers of these components and different configurations thereof may be employed without departing from the scope of the disclosure.

Figure 15:
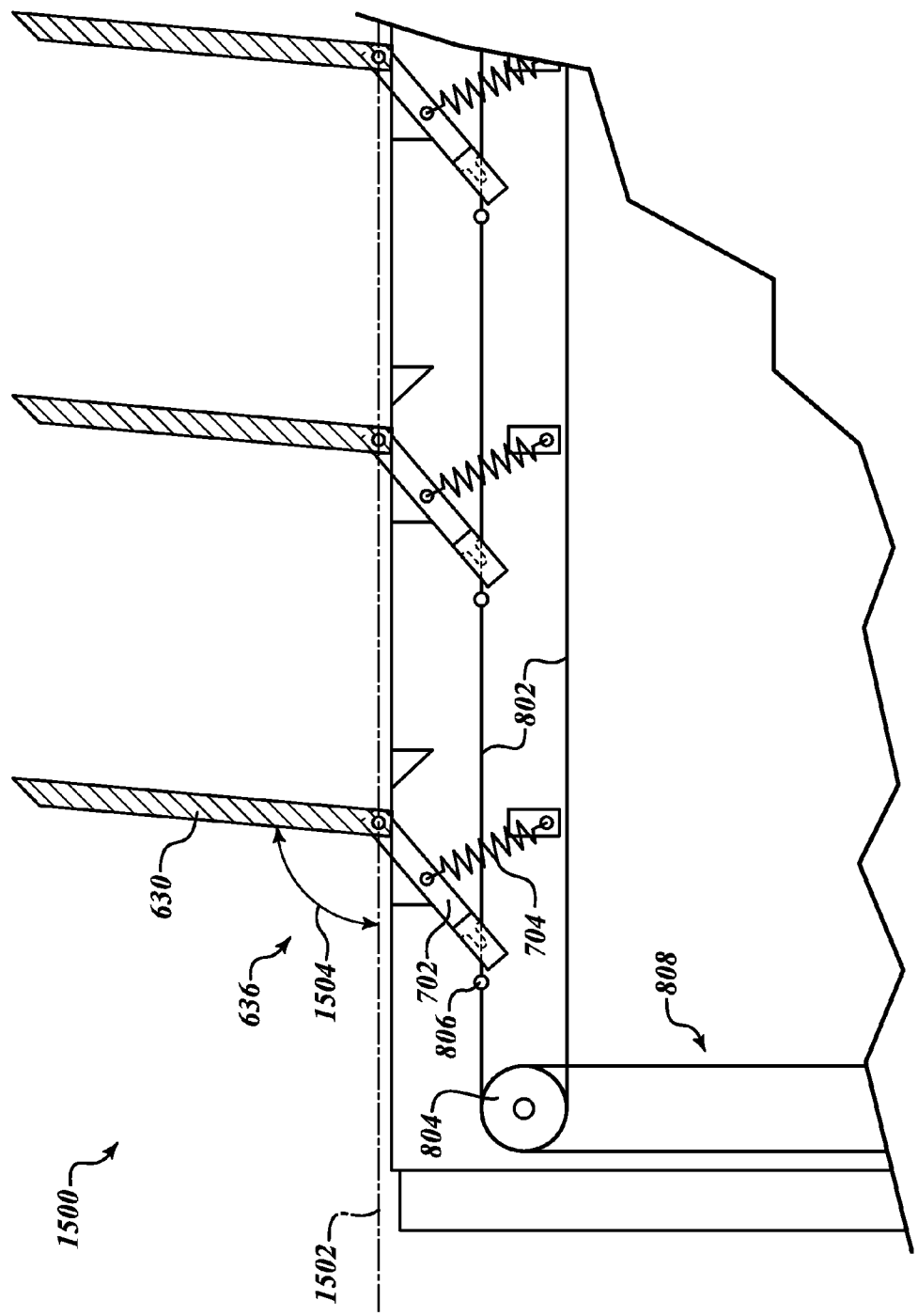
FIG. 15 is a schematic view of the panel movement assembly in a first position according to embodiments of the disclosure.

Referring to FIG. 15, an exemplary actuation assembly 1500 and panel movement assembly 636 are shown supporting a panel in the first (e.g., open) position. In FIG. 15, a horizontal axis 1502 is shown, representing a plane that is substantially parallel to the floor 604 of the trailer 602 (see FIGS. 6 and 8). Accordingly, in the first position, the panel 630 is substantially perpendicular to the horizontal axis 1502. The lever 702 is arranged in a configuration that is substantially skew to the spring mechanism 704. In this position, the top of the trailer 602 is open and material may be loaded in via the roof in the space between the panels 630. The panel 630 forms a panel angle 1504 with respect to the horizontal axis. In the first position, the panel angle is approximately 90 degrees.

In order to move the panel 630 to the second position, the winch mechanism 808 is turned, thereby adjusting the tension of the cable mechanism 802. In some embodiments, the winch mechanism 808 may be turned manually. In other embodiments, the winch mechanism 808 may be turned using an automated actuation method (e.g., a pneumatic cylinder, air, hydraulics).

Figure 16:
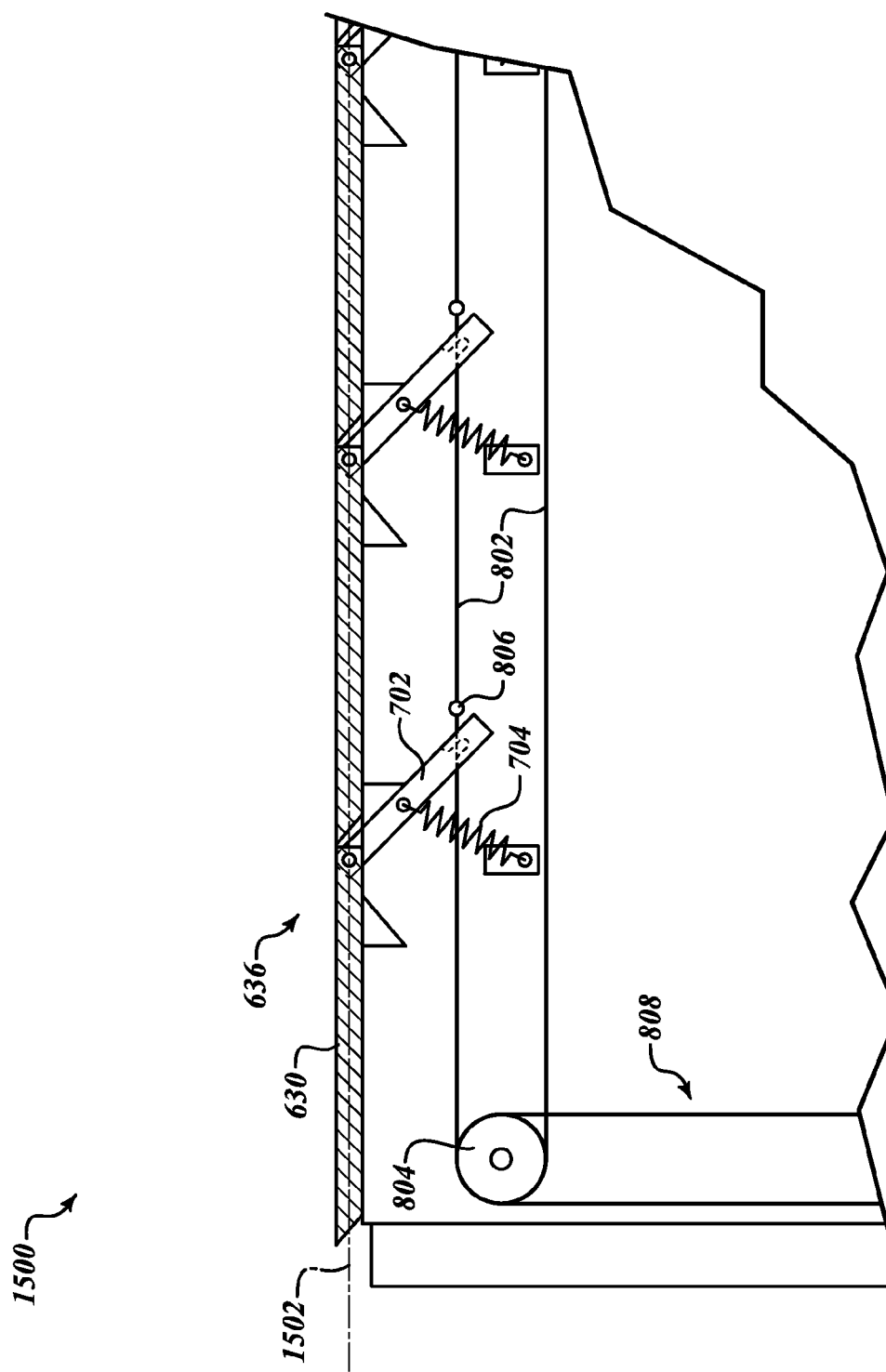
FIG. 16 is a schematic view of the panel movement assembly in a second position according to embodiments of the disclosure.

FIG. 16 shows an exemplary actuation assembly 1500 and panel movement assembly 636 in the second position according to embodiments of the disclosure. In the second position, the panel 630 is substantially parallel to the horizontal axis 1502. The lever 702 is arranged in a configuration that is substantially skew to the spring mechanism 704. In this position, the top of the trailer is substantially closed and material may not be transferred between the inside and the outside. In the second position, the panel angle 1504 is approximately 0 degrees.

Figure 17:
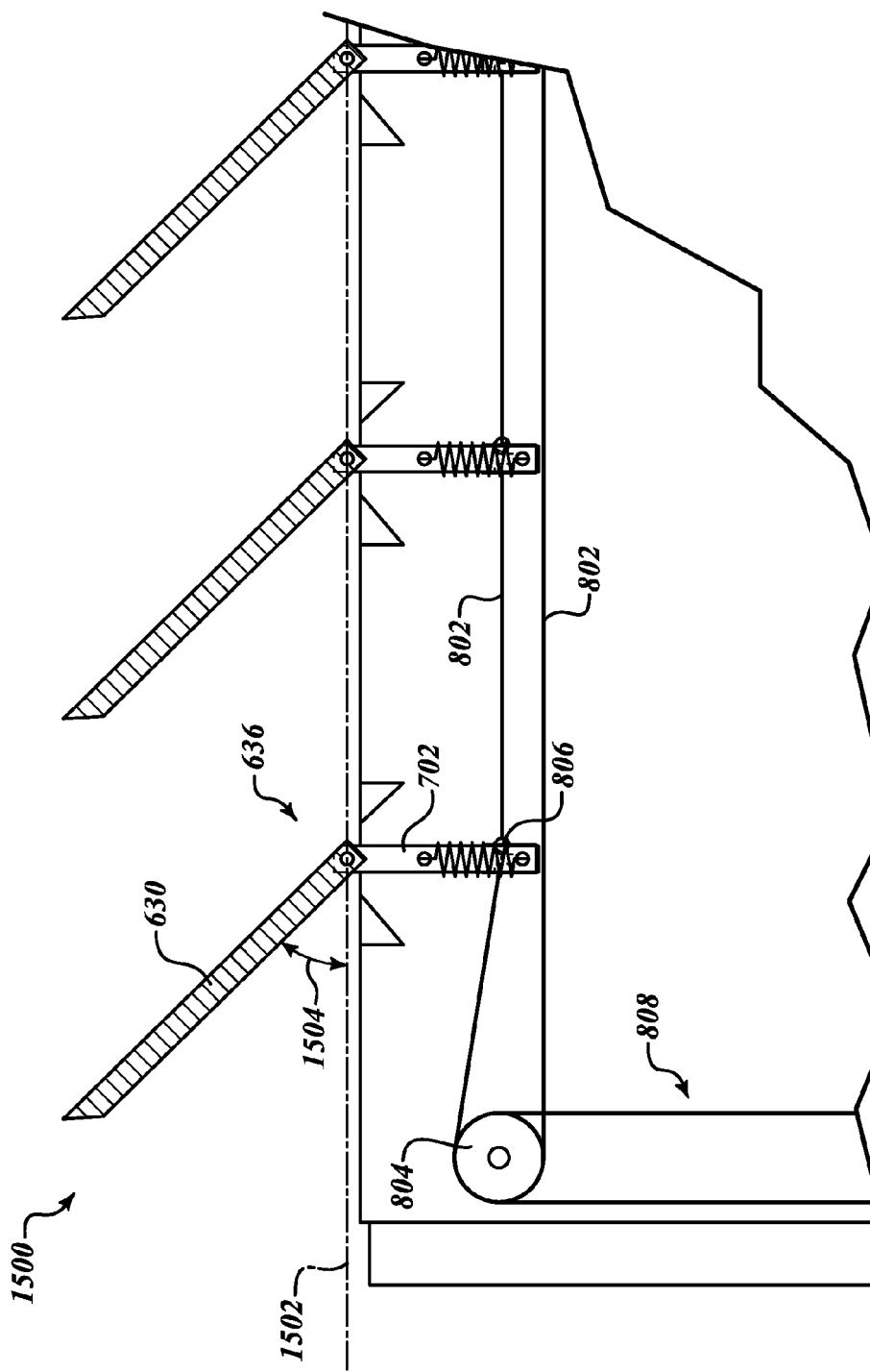
FIG. 17 is a schematic view of the panel movement assembly in an intermediate position according to embodiments of the disclosure.
Figure 18:
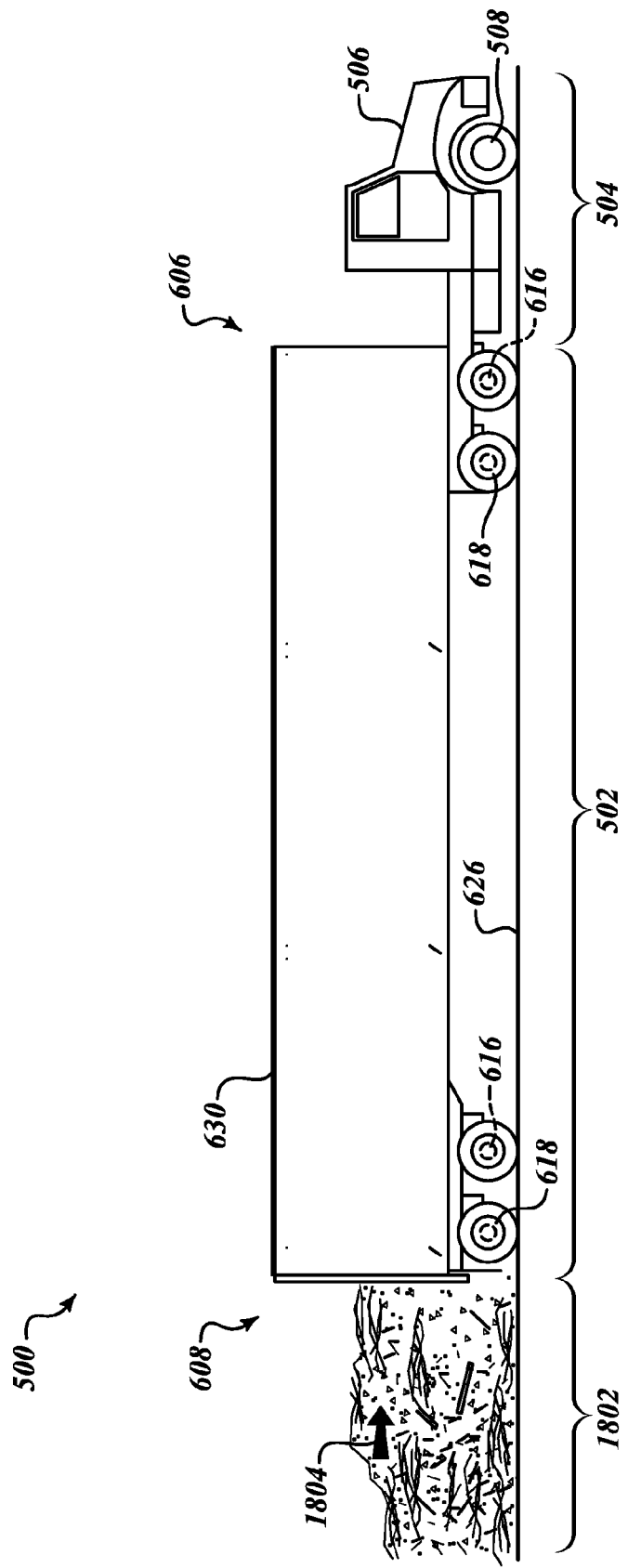
FIG. 18 is a side view of a multipurpose transport system according to embodiments of the disclosure being loaded with forest biomass.

In some embodiments, panels 630 according to the disclosure may be moved to one or more intermediate positions between the first position and the second position. In order to move the panel 630 to such position(s), the winch mechanism 808 may be turned (as described above) to adjust the tension of the cable mechanism 802. FIG. 17 shows an exemplary actuation assembly 1500 and panel movement assembly 636 in an intermediate position according to embodiments of the disclosure. In the intermediate position shown, the panel 630 is substantially skew to the horizontal axis 1502. The lever 702 is arranged in a configuration that is substantially parallel to the spring mechanism 704. Accordingly, the view of the spring mechanism 704 is partially obscured by the lever. In this position, the panel angle 1504 shown is approximately 45 degrees. The spring mechanism 704 is also compressed in this position.

Embodiments of roof assemblies 624 and multipurpose transport systems 500 according to the disclosure may be used for methods for transporting forest biomass and wood residuals. Such methods will now be disclosed with reference to FIGS. 15-20. Figures Referring to FIG. 18, multipurpose transport systems 500 according to the disclosure may be moved to a first location for loading forest biomass 1802. Exemplary first locations may include a forest, plantation, or any other area for collecting forest biomass. According to embodiments of the disclosure, the back end 608 of the trailer 602 may be left open. Alternatively the rear containment device 622 may be removed so that the back end 608 is open. Forest biomass 1802 may then be loaded into the back end 608 of the trailer as indicated by arrow 1804 using conventional methods (e.g., blowing, lifting with machinery). During the loading process, the panels 630 on the roof assembly are generally closed (see FIG. 16); however, in some embodiments, they may be oriented in the open position (see FIG. 15) or oriented in an intermediate position (see FIG. 17).

Figure 19:
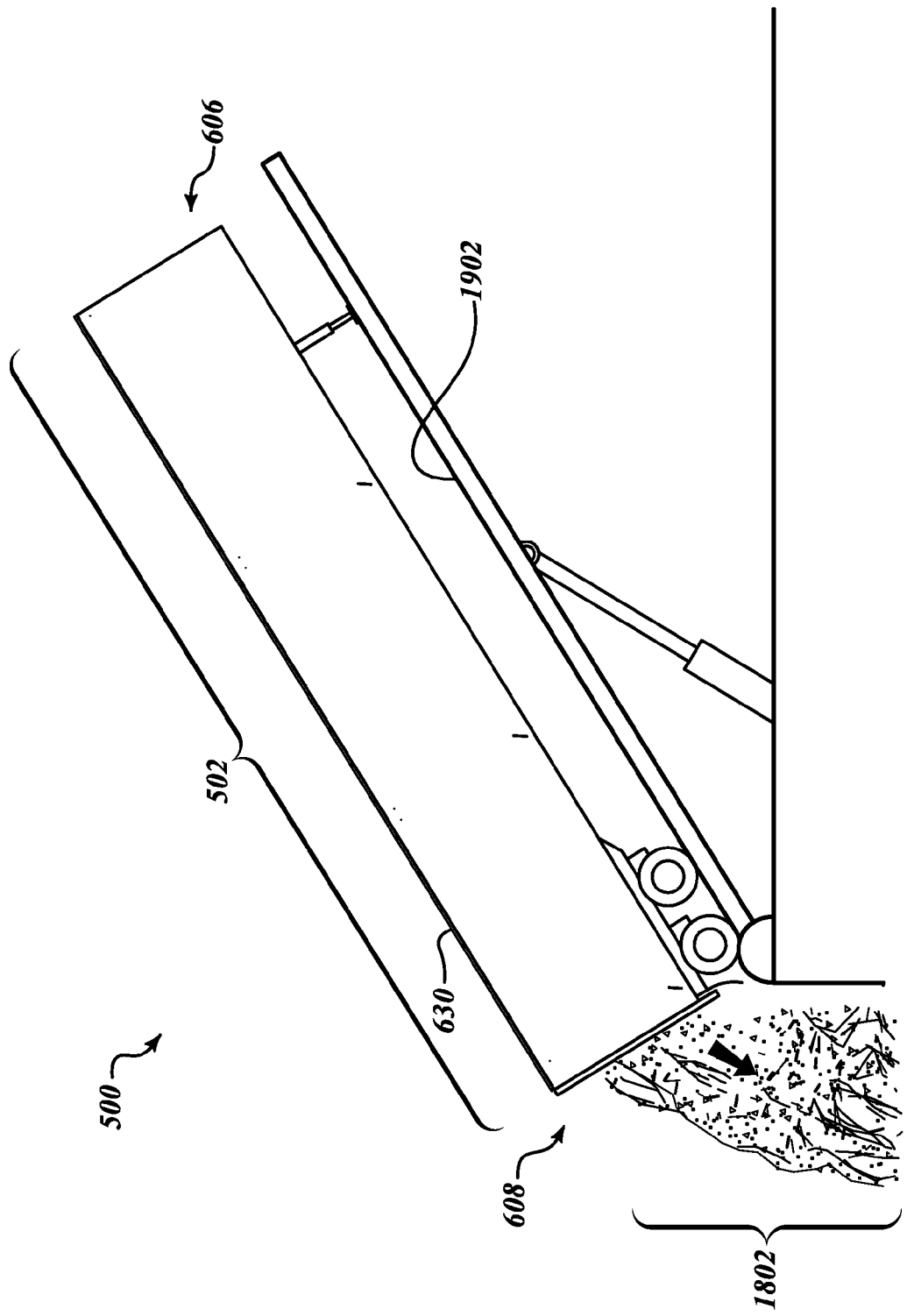
FIG. 19 is a side view of a multipurpose transport system according to embodiments of the disclosure being unloaded.
Figure 20:
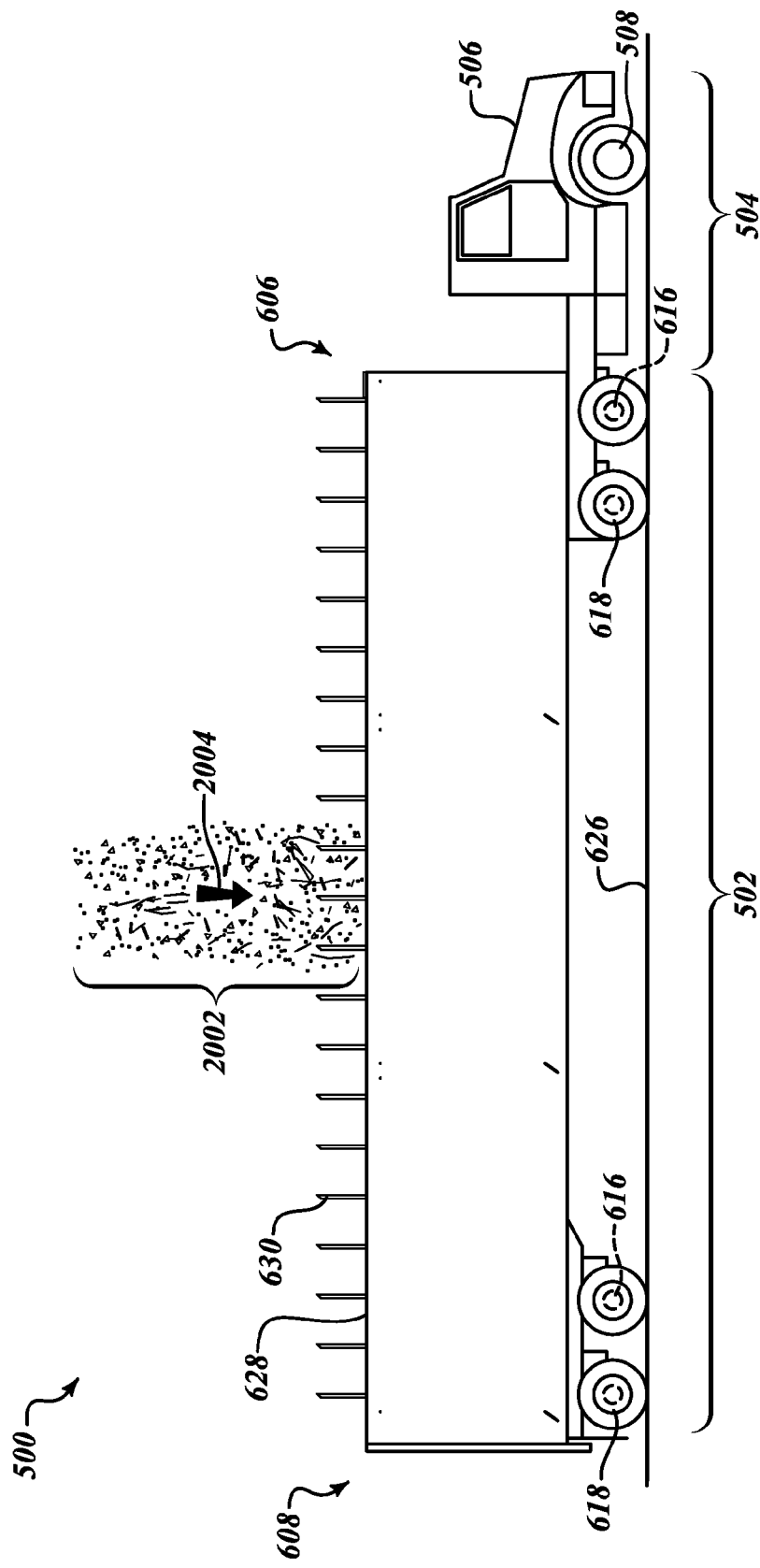
FIG. 20 is a side view of a multipurpose transport system according to embodiments of the disclosure being loaded with wood residuals.

In some embodiments, the panels 630 are moved to the closed position (see FIG. 16) and remain in the closed position while the multipurpose transport assembly moves the forest biomass 1802 to a second location. Exemplary second locations include biomass processing facilities, chemical plants, or any other type of location where moving forest biomass may be desirous. After reaching the second location, the forest biomass 1802 may be unloaded from the trailer 602 using methods known to a person of ordinary skill in the art. FIG. 19 shows an example of one unloading method, which includes placing the trailer 602 on a tipping platform 1902, raising the front end of the trailer 606, and unloading the contents from the back end 608. Although the panels 630 in FIG. 19 are shown to be closed, unloading could theoretically be performed with the panels 630 in the open position or in an intermediate position.

Embodiments of roof assemblies 624 and multipurpose transport systems 500 according to the disclosure may also be used for methods for wood residuals. Figures Referring to FIG. 20, multipurpose transport systems 500 according to the disclosure may be moved to a third location for loading wood residuals 2002. Exemplary third locations may include a saw mill, engineer wood product plant or any other area for collecting wood residuals. According to embodiments of the disclosure, the back end 608 of the trailer 602 is closed (e.g., using the rear containment device 622) during the loading process. The panels 630 are then moved to the open position (see FIG. 15) and wood residuals 1802 are deposited into the top portion 628 of the trailer 602 as indicated by arrow 2004 using conventional methods.

In some embodiments, the panels 630 are then moved to the closed position (see FIG. 16) and remain in the closed position while the multipurpose transport assembly moves the wood residuals 2002 to a fourth location. Exemplary fourth locations include wood product manufacturing facilities, pulp plants, or any other type of location where moving wood residuals may be desirous. After reaching the fourth location, the wood residuals 2002 may be unloaded from the trailer 602 using methods known to a person of ordinary skill in the art (e.g., the method shown in FIG. 19).

From the foregoing, it will be appreciated that the specific embodiments of the disclosure have been described herein for purposes of illustration, but that various modifications may be made without deviating from the disclosure. For example, structural modifications to the shape of the storage assembly 502, movement assembly 504, roof assemblies 624, and other components that would be obvious to a person of ordinary skill in the art may be made. These adjustments may be made based on the mass and weight of the material being carried or the terrain on which the multipurpose transport system 500 is moving.

Aspects of the disclosure described in the context of particular embodiments may be combined or eliminated in other embodiments. For example, features of embodiments of the disclosure suitable for transporting forest biomass may be combined with embodiments of the disclosure suitable for transporting wood residuals. Aspects of embodiments involving retrofitted transport systems may apply to transport systems that are custom built for use with methods according to the disclosure.

Further, while advantages associated with certain embodiments of the disclosure may have been described in the context of those embodiments, other embodiments may also exhibit such advantages, and not all embodiments need necessarily exhibit such advantages to fall within the scope of the disclosure. Accordingly, the invention is not limited except as by the appended claims.

We claim:

1. A storage assembly comprising:
   two opposing side walls extending from the floor;
   a front wall extending from the floor and connected to each of the two opposing side walls;
   a rear containment device extending from the floor at the back end;
   a roof assembly mounted to at least the two opposing side walls, the roof assembly comprising a plurality of panels, wherein each of the plurality of panels is rotatably affixed to the roof assembly and configured to rotate between a first position substantially parallel to the floor and a second position at an angle with respect to the floor; and
   an actuation assembly configured to rotate at least two of the plurality of panels between the first position and the second position such that each of the at least two of the plurality of panels is maintained at substantially the same angle with respect to the floor, wherein the at least two of the plurality of panels are configured to rotate about an axis substantially parallel to the rear containment device.

2. The storage assembly of claim 1 wherein the actuation assembly comprises:
   a reel mechanism;
   a cable mechanism wound around the reel mechanism, the cable mechanism being attached to each of the at least two of the plurality of panels; and
   a winch mechanism operably connected to the cable mechanism.

3. The storage assembly of claim 2 further comprising:
   at least two panel movement assemblies, each of the at least two panel movement assemblies operably connected to one of the at least two of the plurality of panels and to the actuation assembly, wherein each of the at least two panel movement assemblies comprises:
   a lever having a first portion and a second portion; and
   a spring mechanism operably connected to the second portion of the lever and operably connected to one of the two opposing side walls.

4. The storage assembly of claim 3, each of the at least two panel movement assemblies further comprising an engagement mechanism connecting the cable mechanism to the lever.

5. The storage assembly of claim 3 wherein the first portion of the lever is operably connected to the reel mechanism.

6. The storage assembly of claim 3 wherein the spring mechanism is compressed when the at least two of the plurality of panels are in a third position, wherein the third position is between the first position and the second position.

7. The storage assembly of claim 3, further comprising:
two or more barrier devices, each of the two or more barrier devices arranged around one of the two or more panel movement assemblies.

8. The storage assembly of claim 1 wherein the rear containment device comprises at least one of the group consisting of a door, a gate, a mesh covering, and a tarp.

9. The storage assembly of claim 1, further comprising:
one or more movement assemblies operably connected to the storage assembly.

10. A roof assembly mountable on a top portion of a transport system, the transport system comprising two sides, a front, and a back, wherein the back comprises an openable containment device, the roof assembly comprising:
a plurality of panels extending from a first side of the roof assembly to a second side of the roof assembly, wherein each of the plurality of panels is rotatably affixed to the first side of the roof assembly and the second side of the roof assembly, wherein each of the plurality of panels is configured to rotate about an axis substantially parallel to the back of the transport system between a first position substantially parallel to the first and second sides of the roof assembly and a second position at an angle with respect to the first and second sides of the roof assembly;
one or more panel movement assemblies operably connected to at least two of the plurality of panels; and
an actuation assembly operably connected to the one or more panel movement assemblies, wherein the actuation assembly and the one or more panel movement assemblies are configured to maintained each of the at least two of the plurality of panels at substantially the same angle with respect to the first and second sides of the roof assembly.

11. The roof assembly of claim 10 wherein the actuation assembly comprises:
a reel mechanism;
a cable mechanism wound around the reel mechanism, the cable mechanism being attached to each of the at least two of the plurality of panels; and
a winch mechanism operably connected to the cable mechanism.

12. The roof assembly of claim 10 wherein each of the one or more panel movement assemblies comprises:
a lever having a first portion and a second portion; and
a spring mechanism operably connected to the second portion of the lever and operably connected to one of the first and second sides of the roof assembly.

13. The roof assembly of claim 10 wherein each of the at least two of the plurality of panels comprises a top portion and a base portion, the top portion being substantially more narrow than the base portion.

14. The roof assembly of claim 10 wherein each of at least two of the plurality of panels forms approximately a right angle with the first and second sides of the roof assembly when the at least two of the plurality of panels are in the second position.

15. The roof assembly of claim 10 wherein each of at least two of the plurality of panels forms approximately a 45 degree angle with the first and second sides of the roof assembly when the at least two of the plurality of panels are in a third position.

16. The roof assembly of claim 10 wherein each of at least two of the plurality of panels comprises one or more aluminum plates.

17. A method for transporting biomass comprising:
positioning at least two of a plurality of panels in a first position, the plurality of panels located on a roof of a storage assembly, the storage assembly comprising:
a floor,
two opposing side walls extending from the floor,
a front wall extending from the floor and connected to each of the two opposing side walls,
a rear containment device extending from the floor at the back end,
a roof assembly mounted to at least the two opposing side walls, the roof assembly comprising the plurality of panels, wherein each of the plurality of panels is rotatably affixed to the roof assembly and configured to rotate between the first position at an angle with respect to the floor and a second position substantially parallel to the floor, and
an actuation assembly configured to rotate at least two of the plurality of panels between the first position and the second position such that each of the at least two of the plurality of panels is maintained at substantially the same angle with respect to the floor, wherein the at least two of the plurality of panels are configured to rotate in the same direction about an axis substantially parallel to each other;
loading biomass into the storage assembly at a first location by passing the biomass through the roof assembly when the at least two of the plurality of panels are in the first position;
actuating the actuation assembly, causing the at least two of the plurality of panels to substantially simultaneously rotate between the first position and the second position; and
transporting the storage assembly to a second location when the at least two of the plurality of panels are in the second position.

18. The method of claim 17, further comprising:
opening the back end of the storage assembly at the second location; and
unloading the biomass from the storage assembly at the second location.

19. The method of claim 17, further comprising:
actuating the actuation assembly at the second location, causing the at least two of the plurality of panels to substantially simultaneously rotate between the second position and the first position; and
loading wood residuals into the storage assembly at the second location by passing the wood residuals through the roof assembly when the at least two of the plurality of panels are in the first position.

20. The method of claim 19, further comprising:
actuating the actuation assembly at the second location, causing the at least two of the plurality of panels to substantially simultaneously rotate between the first position and the second position; and
transporting the storage assembly to a third location when the at least two of the plurality of panels are in the second position; and
unloading the wood residuals from the storage assembly at the third location.

* * * * *